June 2, 1953
C. H. BROWN
2,640,718
IMPLEMENT TOOL BAR CLAMP
Filed June 28, 1948
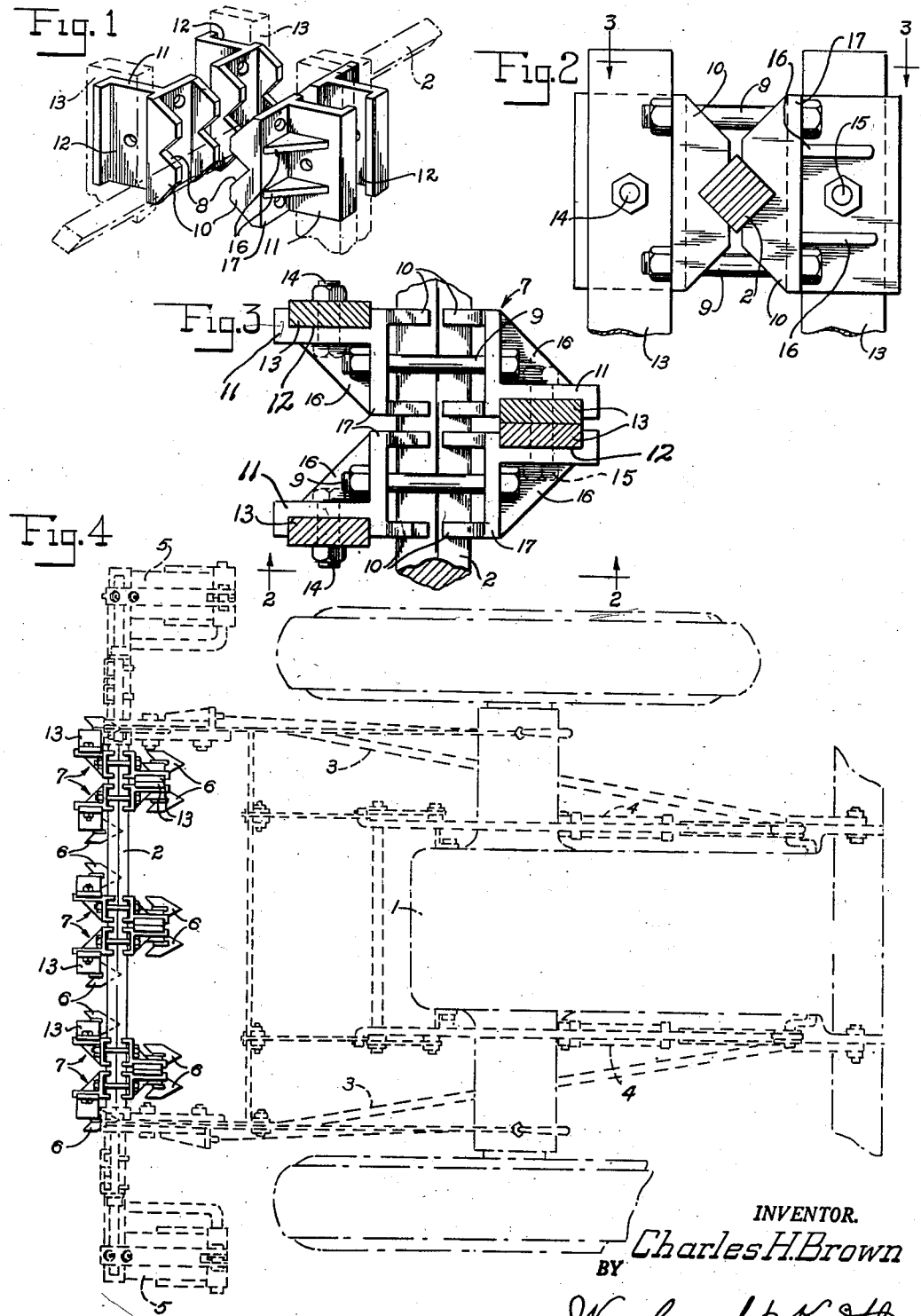
INVENTOR.
Charles H. Brown
BY
Wayland D. Keith
HIS AGENT Patented June 2, 1953

2,640,718

UNITED STATES PATENT OFFICE 2,640,718

IMPLEMENT TOOL BAR CLAMP

Charles H. Brown, Breckenridge, Tex.

Application June 28, 1948, Serial No. 35,629

2 Claims. (Cl. 287—54)

This invention relates to improvements in clamps and more particularly to tool bar clamps, to which plows and tilling implements may be attached.

Various clamps for implement tool bars have been proposed heretofore, but these, for the most part, have been designed to perform a specific function, and have not been universally adaptable to change and for adaptation for various uses.

An object of this invention is to provide an implement tool bar clamp that may be readily removed, adjusted, or altered without the necessity of using a separate clamp for each individual job.

Another object of this invention is to provide an implement tool bar clamp that is simple in construction, easy to manufacture, universally adaptable for attachment of plows and other tilling implements thereto, and is sturdy in construction.

The present clamp is so designed as to be used in pairs or in multiple units, which units are reversible so as to give an offset effect with respect to the complementary half of the clamp. The clamp may be used for vertical type plow beams or it may be used with and is equally well adapted to horizontal type plow beams, whether they project forward or rearward, by merely placing the clamp on a face of a square implement tool bar which positions the clamp at 90 degree variations on the said tool bar.

The tool bar clamp and the various applications thereof, as shown in the accompanying drawings, has been shown disposed with respect to vertical plow beams and a particular adaptation thereof; however, the clamps do not necessarily have to be used in the particular relation shown, as two half clamps make up a unit on which plow beams may be secured. While one of these clamp portions is shown in one position as offset with respect to the complementary portion, by reversing one of the portions of the clamp, the beams attached thereto both will lie in the same vertical plane passing at right angles to the implement tool bar.

Various other modifications and adaptations of this clamp may be made to adapt it to the particular tooling problem of the implement. Specific reference has been made to the clamp with respect to its use on a tool bar, but it is to be understood that the clamp may be used within any art to which it may be adapted, as set forth in the appended claims.

An embodiment of this invention is illustrated in the accompanying drawings, in which:

Fig. 1 is an exploded perspective view of a plurality of the clamps beside an implement tool bar, which tool bar is shown in dot-dash outline;

Fig. 2 is a fragmentary sectional view through an implement tool bar, showing the clamps attached thereto, and with the upper portions of plow beams attached to the clamps;

Fig. 3 is a horizontal sectional view taken on the line 3—3 of Fig. 2; and

Fig. 4 is a top plan view of a rear portion of a tractor, showing an implement tool bar attached thereto, and showing clamps, plow beams, and plows connected to said tool bar, with portions of the tractor and tool bar shown in dot-dash outline.

With more detailed reference to the drawings, the numeral 1 designates generally a tractor which has a tool bar 2, mounted on the rear thereof, usually square in cross section, which tool bar 2 is connected to a draw bar 3 in a manner well understood in the art.

The implement tool bar 2 is adapted to be raised and lowered by hydraulic mechanism, which is shown at 4, and which is attached to and usually forms a part of the conventional farm-type tractor. The tool bar 2 may have depth gauge wheels 5 connected therewith for controlling the cutting depth of the plows 6.

An implement tool bar clamp is designated generally by the numeral 7. Each clamp is formed in complementary halves or sections, which form clamping members and which are substantially identical with each other in the form illustrated, although they may vary if desired. Each section of the clamp 7 is formed of an upright plate or body portion 17, having a pair of spaced webs or ribs 10, projecting in one direction therefrom, and a flange or lug 11 projecting in the opposite direction therefrom and having a lip on the outer edge thereof. Each rib 10 has the inner edge thereof notched at 8 to form a portion of a square, adapted to fit on the squared implement tool bar 2, so that when the clamp is drawn into binding engagement with the implement tool bar 2 by bolts 9, the implement tool bar clamp will be secured thereto against longitudinal movement thereon. It is preferable to have the tool bar engaging ribs 10 spaced apart so as to give a more uniform engagement with respect to the tool bar 2 when the squared notches 8 engage the tool bar 2.

The lug or flange 11 has a channel 12 formed between the lip thereon and the edge portion of the plate 17, adapted to receive a plow beam 13 or the like. The plow beam 13 is adapted to be secured in place by a bolt 14 which is passed through the plow beam and through the channeled face 12 of the lug 11 in one position of the beam with respect to the clamp, as illustrated in Figs. 2 and 3.

When two pairs of clamps are used in the relation as shown in Figs. 1, 3 and 4, a bolt 15 may be passed through two of the channeled portions 12 to secure a pair of beams together in binding relation, as shown in Figs. 3 and 4. These beams may be offset laterally so that the plows 6 may be spaced the desired distance apart, or, if desired, the double plow beams may be used to give added strength on which double beams a single plow may be fitted.

It is pointed out that with this particular type of construction, the clamps may be made light in weight and that they are so designed and braced as to give a maximum of strength with a minimum of material. The outwardly projecting lug 11 is braced by brace members 16 to the outwardly projecting body portion 17 of the clamp 7, which prevents bending because of lateral strain.

Various settings of the clamp on the tool bar may be made readily by loosening the bolts 9 and sliding the clamp to the desired place and tightening the bolts again, or the clamp portions may be reversed relative to each other, or secured in place on any quarter of the implement tool bar 2 to accommodate either vertical or horizontal plow beams.

The clamp sections may be secured to the tool bar in different positions with respect to each other. Thus the lugs 11 may be offset from each other, as shown in Fig. 3, to locate the plows 6 connected with the lugs out of line with each other, as shown in Fig. 4. With one of the sections inverted relative to the other, the lugs and plow beams will be located in the same longitudinal plane, to position one plow behind another.

As outlined above, these clamps may be used either singly, in pairs or in multiple units of pairs, according to the demand of the particular plow arrangement.

While the invention is illustrated and described in one embodiment thereof, it is to be understood that various changes may be made in the details of construction without departing from the spirit of the invention as claimed.

I claim:

1. A clamping means consisting of two or more clamping members each comprised of a rectangular plate, a pair of parallel webs projecting vertically from one side of said plate, said webs having aligned notches in the edges thereof remote from said plate, and a single flange projecting from the side of said plate opposite said webs, said flange being offset from the edge of said plate and having a lip on the edge thereof remote from said plate, said lip and the offset portion of said plate with said flange defining a channel, said flange lying in a plane parallel to a plane passing through said webs, said plate having openings therein for the passage of securing means to maintain the clamping members on a supporting bar and said flange having an opening therein for the passage of a securing means to maintain a supported member in said channel.

2. Clamping means comprising two or more clamping members each including a plate, a pair of substantially parallel webs projecting laterally from one side of said plate, said webs having aligned notches in the edges thereof remote from said plate to receive a supporting bar therein, a flange extending laterally from the side of said plate opposite said webs and spaced from the edge of said plate, said flange having a lip on the edge thereof remote from said plate, said lip and the edge portion of said plate with said flange defining a channel, said flange lying in a plane substantially parallel with a plane passing through at least one of said webs, said plate having openings therein for the passage of securing means to maintain the clamping members on the supporting bar and said flange having an opening therein for the passage of securing means to maintain a supported member in said channel.

CHARLES H. BROWN.

References Cited in the file of this patent

UNITED STATES PATENTS

| Number | Name | Date |
| --- | --- | --- |
| 82,738 | Moorehead | Oct. 6, 1868 |
| 768,819 | Palmer | Aug. 30, 1904 |
| 1,612,516 | Lampert | Dec. 28, 1926 |
| 2,018,539 | Welsh | Oct. 22, 1935 |
| 2,101,317 | Lemieux | Dec. 7, 1937 |
| 2,385,950 | Silver | Oct. 2, 1945 |